United States Patent
Sha et al.

(10) Patent No.: US 12,187,646 B2
(45) Date of Patent: Jan. 7, 2025

(54) SYNCHRONOUS SINGLE-LIQUID GROUTING SLURRY, ITS TECHNOLOGY AND APPLICATION FOR LARGE DIAMETER SHIELD ENGINEERING UNDER WATER-RICH, HIGH-PRESSURE AND WEAK SOIL STRATA CONDITIONS

(71) Applicants: Ocean University of China, Shandong (CN); China Railway 14th Bureau Group Corporation Limited, Shandong (CN); China Railway 14th Bureau Group Shield Engineering Coporation Limited, Suzhou (CN)

(72) Inventors: Fei Sha, Shandong (CN); Jian Chen, Shandong (CN); Zhe Zhang, Suzhou (CN); Peng Chen, Suzhou (CN); Jianyong Zhang, Suzhou (CN); Shutong Yang, Shandong (CN); Mingshuai Xi, Shandong (CN); Tao Liu, Shandong (CN); Yixiang Li, Jiangsu (CN); Gongbiao Yang, Shandong (CN); Qingsheng Meng, Shandong (CN); Qiguang Duan, Suzhou (CN); Yuhong Diao, Shandong (CN); Jicheng Shu, Suzhou (CN); Rui Fan, Shandong (CN); Lanying Zhang, Shandong (CN); Meng Bu, Shandong (CN); Naiyin Yang, Shandong (CN); Hao Kong, Shandong (CN)

(73) Assignees: Ocean University of China, Shandong (CN); China Railway 14th Bureau Group Corporation Limited, Shandong (CN); China Railway 14th Bureau Group Shield Engineering Coporation Limited, Jiangsu (CN)

(*) Notice: Subject to any disclaimer, the term of this patent is extended or adjusted under 35 U.S.C. 154(b) by 202 days.

(21) Appl. No.: 18/089,572

(22) Filed: Dec. 28, 2022

(65) Prior Publication Data
US 2023/0212074 A1 Jul. 6, 2023

(30) Foreign Application Priority Data
Dec. 31, 2021 (CN) .......................... 202111677541.4

(51) Int. Cl.
*C04B 28/00* (2006.01)
*C04B 18/12* (2006.01)
(Continued)

(52) U.S. Cl.
CPC .............. *C04B 28/14* (2013.01); *C04B 18/12* (2013.01); *C04B 18/146* (2013.01);
(Continued)

(58) Field of Classification Search
CPC ....... C04B 28/14; C04B 18/12; C04B 18/146; C04B 18/165; C04B 22/0093;
(Continued)

(56) References Cited

U.S. PATENT DOCUMENTS

2012/0145047 A1* 6/2012 Constantz .............. B01D 53/62
106/738
2022/0397036 A1* 12/2022 Chen ..................... E21D 9/0607

FOREIGN PATENT DOCUMENTS

CN 107572994 1/2018
CN 107619236 1/2018

\* cited by examiner

Primary Examiner — Carib A Oquendo
(74) Attorney, Agent, or Firm — JCIPRNET (57) ABSTRACT

A synchronous single-liquid grouting slurry, its technology and application for large diameter shield engineering under water-rich, high-pressure and weak soil strata conditions, comprising raw materials: 1050-1200 parts of gold tailing,
(Continued)

420-480 parts of silicate cement clinker, 220-240 parts of fly ash, 45-120 parts of waste clay brick, 65-95 parts of slag, 25-45 parts of limestone tailing, 70-80 parts of steel slag, 30-45 parts of silica fume, 15-22 parts of desulfurized gypsum, and 9-15 parts of quick-setting and early-strength composite additive. The invention controls the $d_{50}$, $d_{85}$ and $d_{95}$ of the material particles as 35-40, 42-48 and 50-55 μm, respectively. Gold tailing with the particle size of 120-600 μm being used as the fine aggregate, their volume fractions are 40-60%. The slurry production technique, comprising crushing-sieving-superfine ball milling-homogenization-particle size classification-variable speed mixing being developed. The shield tail eight-point grouting technique is being developed for filling.

18 Claims, 4 Drawing Sheets

(51) Int. Cl.
*C04B 18/14* (2006.01)
*C04B 18/165* (2023.01)
*C04B 22/00* (2006.01)
*C04B 22/08* (2006.01)
*C04B 24/04* (2006.01)
*C04B 24/12* (2006.01)
*C04B 28/14* (2006.01)
*C04B 40/00* (2006.01)
*E21D 11/10* (2006.01)
*C04B 111/00* (2006.01)
*C04B 111/70* (2006.01)
*C04B 111/74* (2006.01)

(52) U.S. Cl.
CPC ........ *C04B 18/165* (2013.01); *C04B 22/0093* (2013.01); *C04B 22/085* (2013.01); *C04B 24/04* (2013.01); *C04B 24/122* (2013.01); *C04B 40/0042* (2013.01); *C04B 40/0046* (2013.01); *E21D 11/105* (2013.01); *C04B 2111/00146* (2013.01); *C04B 2111/00706* (2013.01); *C04B 2111/70* (2013.01); *C04B 2111/74* (2013.01)

(58) Field of Classification Search
CPC ..... C04B 22/085; C04B 24/122; C04B 24/04; C04B 40/0042; C04B 40/0046; E21D 11/105; E21D 11/10
See application file for complete search history.

SYNCHRONOUS SINGLE-LIQUID GROUTING SLURRY, ITS TECHNOLOGY AND APPLICATION FOR LARGE DIAMETER SHIELD ENGINEERING UNDER WATER-RICH, HIGH-PRESSURE AND WEAK SOIL STRATA CONDITIONS

CROSS-REFERENCE TO RELATED APPLICATION

This application claims the priority benefit of China application no. 202111677541.4, filed on Dec. 31, 2021. The entirety of the above-mentioned patent application is hereby incorporated by reference and made a part of this specification.

TECHNICAL FIELD

This invention refers to a synchronous single-liquid grouting slurry, its technology and application for large diameter shield engineering under water-rich, high-pressure and weak soil strata conditions, which belongs to the field of grouting technology for tunneling and underground engineering.

BACKGROUND

With the rapid development of underground space engineering, shield method is widely used in urban tunnel construction and it is a fast and safe construction method. Risk sources such as proximity complex construction, underpassing, side crossing rivers and buildings are inevitable, which brings great construction challenges and it also has higher requirements for stratum settlement control. For large diameter shield engineering, the larger the shield diameter, the larger diameter of shield segment ring, and the greater buoyancy of the segment ring in the high-density liquid mortar when the segment interspace is not filled in time or the setting time of mortar is too slow. At the same time, the diameter of shield machine increases, the gap between segment outer ring and excavated soil stratum increases, and the uplift space and uplift amount of the pipe piece also increases, so it must be backfilled quickly with sufficient grouting mortar to avoid deformation of the surrounding soil. In addition, under the environment of groundwater scouring and possible ultra-high pressure in the shield construction of water-rich soft strata, ordinary slurry is easily washed away and low filling strength is often caused, and the grouting circle loses its waterproofing and bearing capacity, which then causes large stratum deformation and excessive settlement of the ground surface. The quality of synchronous grouting is the dominant factor for settlement of ground surface.

When synchronous grouting, ordinary single-liquid slurry is prone to delamination, segregation and bleeding water during storage and long-distance pumping, which cannot meet the requirements of injectability of synchronous grouting. The separation of slurry aggregate and slurry body leads to insufficient strength of slurry, and it is difficult to fill the gap behind the segment completely, facing the risk of large surface settlement and water leakage from the pipe sheet. At the same time, the higher water pressure, the higher requirement standards for shield slurry filling strength, filling rate and durability. For the problems of high-pressure large-diameter shield synchronous grouting, a synchronous shield grouting slurry with good filling performance, good water dispersion resistance, suitable setting time, suitable early strength, good seepage resistance and long-term stability is needed. The realization of these good properties of high-pressure large-diameter shield synchronous single-liquid slurry requires creative selecting of its formulation as well as preparation process, and innovative development of supporting high-pressure large-diameter shield synchronous grouting technology.

SUMMARY

In response to the above problems, this present invention provides a synchronous single-liquid grouting slurry for large diameter shield engineering under water-rich, high-pressure and weak soil strata conditions. The slurry has excellent performance through the selection of raw material and content optimizing. The slurry has high filling rate, good fluidity, controllable setting time, considerable early strength, good long-term stability performance, it has no delamination, segregation, water bleeding and other problems during storage and long-distance pumping. It meets the requirements of synchronous shield grouting, a large amount of industrial solid waste such as gold tailing is used in raw materials, which ensure its low cost, low price, nontoxicity and safety. It has advantages of energy saving, environmental friendliness, and efficient resource recycling, and it can prevent the floating of shield segment effectively and control the strata deformation for a long time.

The specific technical solution of this invention is as follows:

A synchronous single-liquid grouting slurry for large diameter shield engineering under water-rich, high-pressure and weak soil strata conditions, comprising the following weights of raw materials: 1050-1200 parts of gold tailing, 420-480 parts of silicate cement clinker, 220-240 parts of fly ash, 45-120 parts of waste clay brick, 65-95 parts of slag, 25-45 parts of limestone tailing, 70-80 parts of steel slag, 30-45 parts of silica fume, 15-22 parts of desulfurized gypsum, and 9-15 parts of quick-setting and early-strength composite additive.

Further, the slurry contains water in addition to the above-mentioned raw materials, and the water being added in a certain water to binder ratio (w/b).

Further, in the synchronous single-liquid grouting slurry for large diameter shield engineering under water-rich, high-pressure and weak soil strata conditions, the large diameter refers to diameter greater than 11 m, and high-pressure refers to water bearing pressure greater than 0.5 MPa. Wherein water-rich and weak soil strata include water-rich silt layers, water-rich medium-coarse sand layers, water-rich medium-fine sand layers, water-rich clay layers or water-rich fluid plastic soil layers.

Preferred, the synchronous single-liquid grouting slurry for large diameter shield engineering under water-rich, high-pressure and weak soil strata conditions comprises the following weights of raw materials: 1100-1200 parts of gold tailing, 450-480 parts of silicate cement clinker, 230-240 parts of fly ash, 75-120 parts of waste clay brick, 75-95 parts of slag, 30-45 parts of limestone tailing, 70-80 parts of steel slag, 30-45 parts of silica fume, 15-22 parts of desulfurized gypsum, 10-13 parts of quick-setting and early-strength composite additive.

Further, the quick-setting and early-strength composite additive comprises the following weight of raw materials: 30-35% of calcium formate, 30-35% of triethanolamine, 15-20% of sodium aluminate, 10-15% of calcium nitrite.

Preferred, the quick-setting and early-strength composite additive comprises the following weight of raw materials:

32-35% calcium formate, 32-35% triethanolamine, 15-18% sodium aluminate, 13-15% calcium nitrite.

Further, the $d_{50}$ of silicate cement clinker, fly ash, waste clay brick powder, slag powder, limestone tailing powder, steel slag powder, silica fume, and desulfurization gypsum is all preferably selected as 35-40 μm, the $d_{85}$ of silicate cement clinker, fly ash, waste clay brick powder, slag powder, limestone tailing powder, steel slag powder, silica fume, and desulfurization gypsum is all preferably selected as 42-48 μm, and the $d_{95}$ of silicate cement clinker, fly ash, waste clay brick powder, slag powder, limestone tailing powder, steel slag powder, silica fume, and desulfurization gypsum is all preferably selected as 50-55 μm.

Further, the gold tailing comprises a gold tailing I with a maximum particle size $d_{max}$ of particle less than 120 μm for gold tailing I, and a gold tailing II with a particle size between 120-600 μm, and a volume fraction of gold tailing II is about 40-60% in the total volume of the slurry.

This present invention applies gold tailing in the preparation of shield synchronous grouting slurry innovatively, and the 40-60% volume fraction of the gold tailing II with particle size range of 120-600 μm is innovatively applied as slurry fine aggregate. The main components of gold tailing are $SiO_2$, $CaO$, $Fe_2O_3$ and $Al_2O_3$, their particles are fine, most of them are among 60-600 μm, which can save the grinding energy consumption. This invention sieves gold tailing, the gold tailing I with maximum particle size $d_{max}$ less than 120 μm are ground together with other solid waste materials to be cementitious materials with various hydration products; the gold tailing II with particle size range of 120-600 μm is used as fine aggregate, which plays the role in replacing natural river sand. The addition of gold tailing with coarser particle sizes can increase the fluidity and filling efficiency of the synchronous single-liquid grouting slurry, and with the addition of gold tailing, the amount of bleeding water will reduce significantly. At the same time, it forms a skeleton in the hardened slurry, which has a positive effect on the filling strength.

Further, silicate cement clinker is a high-quality hydraulic cementitious material, its hydration products mainly include hydrated calcium silicate gel (CSH gel), ettringite and other minerals, and CSH gel is the main source of the strength of the cement stone, the cement clinker has high strength after hydration, and its hydration products can be closely cemented with the sand layer or soil stratum to improve the seepage resistance of the reinforced strata.

Further, fly ash has high volcanic ash activities. The finer the fly ash is, the smaller its particle size is, and its volcanic ash activity is higher. The addition of fly ash can reduce the hydration heat and increase the impermeability, peaceability and durability.

Further, the waste clay brick has some volcanic ash activities. With the increase of curing age, the volcanic ash activity of clay brick powder starts to begin, it reacts with the cement hydration product $Ca(OH)_2$ to generate new gels to fill in pores, which has improved later compressive strength.

Further, the glass body of slag powder can be up to 95% or more, the calcium-rich phase in the glass body of slag powder is the structure forming body of the slag glass body, the discontinuous silica-rich phase is wrapped by the continuous calcium-rich phase, the calcium-rich phase has high hydration activity and it also has a certain chemical stability.

Further, limestone tailing powder is a non-inert material, during the hydration process, limestone tailing powder can chemically react with $C_3A$ and $C_4AF$ in cement to further generate a new product, it is calcium carboaluminate hydrate, and it has a significant improvement in some properties of cement-based materials. The calcium hydroxide generated after the hydration reaction of cement can further react with limestone tailing powder and produce alkaline calcium carbonate.

Further, steel slag is a by-product of the steel making process, and the addition of steel slag can improve the flexural strength and corrosion or water resistance. This invention uses steel slag powder, which reduces the particle size of steel slag, increases the specific surface area, and further enhances the cementation property. Meanwhile, f-CaO and f-MgO in steel slag produce a small amount of CH and $Mg(OH)_2$ to compensate volume shrinkage at later stages of hydration.

Further, silica fume contains a large amount of non-crystalline silica, its activity is high, its specific surface area is large (20000-28000 m$^2$/kg), particles which are less than 1 μm accounts for more than 80%, and it mainly hydrates with calcium hydroxide during the middle and late volcanic ash reaction; the glass body structures in slag and fly ash in disintegrate under alkali excitation conditions, the $SiO_4^{4-}$, $AlO_4^{5-}$, $Ca^{2+}$ are generated and recombined, alkaline conditions can accelerate the volcanic ash reaction of silica in silica fume, the above eventually formed a large number of new hydrated calcium silicate, calcium aluminate silicate hydrate gels and other effective hydrated minerals.

Further, desulfurization gypsum, also known as smoke desulfurization gypsum, is a kind of industrial by-product gypsum, its main component is calcium sulfate dihydrate, whose content is about 93%, and desulfurization gypsum is used to control the hydration reaction stability of silicate cement clinker, and prevent the too fast setting phenomenon of cement clinker, and it can increase the density of stone body through the reaction; and desulfurization gypsum can reduce the material cost instead of natural gypsum, which is conducive to green cycle development.

Further, the quick-setting and early-strength composite additive is got through the combined effects of sodium aluminate, calcium formate, calcium nitrite and triethanolamine, it can not only improve the early strength of cement stone, promote the hydration degree and rate of minerals in the early hydration composite system, but also strengthen the density of the solid-phase bulk structure of cement, achieving the purpose of ensuring the early and later strength at the same time.

Further, this invention provides a preparation process for synchronous single-liquid grouting slurry for large diameter shield engineering under water-rich, high-pressure and weak soil strata conditions, comprising:

(1) the silicate cement clinker, the steel slag, the waste clay brick, the slag and the limestone tailing being crushed separately, then being ball-milled until a maximum particle size being less than 120 μm, and then the required materials being weighed and mixed for later use;

(2) the gold tailing being sieved to obtain gold tailing I with maximum particle size $d_{max}$ less than 120 μm and gold tailing II with particle size ranging of 120-600 μm, the gold tailing being weighed according to the proportion of gold tailing II is 40-60% of a total volume of the slurry for later use;

(3) the fly ash, the silica fume and the desulfurization gypsum being sieved so that their maximum particle sizes being less than 120 μm, and then being weighed and mixed well for later use;

(4) a mixture in step (1), the gold tailing I with the maximum particle size $d_{max}$ less than 120 μm in step (2) and a mixture in step (3) being mixed uniformly, and then being ball-milled until the $d_{50}$, $d_{85}$ and $d_{95}$ of the material particles are 35-40, 42-48 and 50-55 μm, respectively, and a mixing group I being obtained;

(5) the calcium formate, the triethanolamine, the calcium nitrite and the sodium aluminate being weighed according to a proportion, being mixed and dissolved in water at 200-300 r/min for at least one minute, and a mixing group II being obtained;

(6) the mixing group I and the mixing group II being mixed in a ratio of water-binder ratio (w/b) of 0.8:1-1.5:1, and then the mixtures being mixed at a stirring speed of 1000-1500 r/min for at least 5 minutes;

(7) gold tailing II with the particle size range of 120-600 μm being added to the mixture in step (6), being stirred at the speed of 500-800 r/min for at least 4 minutes, then a stirring speed being adjusted to be 1000-1500 r/min for at least 1 minute to obtain a synchronous single-liquid grouting slurry for large diameter shield engineering under water-rich, high-pressure and weak soil strata conditions.

Further, in step (7), a volume fraction of the gold tailing II is about 40-60% in the total volume of the slurry.

Further, in step (6), the mixing group I and the mixing group II being mixed in a ratio of w/b of 0.8:1-1:1, where the performance of the slurry is better.

Further, in step (6), the slurry is stirred at a stirring speed of 1000-1500 r/min for 5-10 minutes.

Further, in step (7), the slurry is stirred at a stirring speed of 500-800 r/min for 4-6 minutes and at a stirring speed of 1000-1500 r/min for 1-5 minutes.

Further, the present invention provides the application of the synchronous single-liquid grouting slurry for large diameter shield engineering under water-rich, high-pressure and weak soil strata conditions, the slurry is applied for synchronous grouting filling gaps and reinforcement under water-rich, high-pressure and weak soil strata conditions.

Further, the synchronous single-liquid grouting slurry is suitable for applying in the construction of large-diameter shield machines with diameters greater than 11 m in water-rich weak soil strata with water-bearing pressures greater than 0.5 MPa, wherein the water-rich and weak soil strata include water-rich silt layers, water-rich medium-coarse sand layers, water-rich medium-fine sand layers, water-rich clay layers or water-rich fluid plastic soil layers.

Further, the synchronous single-liquid grouting slurry for large diameter shield engineering under water-rich, high-pressure and weak soil strata conditions is applied with the synchronous grouting system accordingly, and the synchronous single-liquid grouting slurry flows through the grouting pipeline of the grouting system to achieve shield filling and grouting reinforcement. The synchronous grouting system is reported at present, the synchronous grouting system is optimized, and the synchronous grouting system with multiple grouting pipelines is preferably adopted.

Further, the present invention provides a shield synchronous grouting technique, the grouting technique includes the steps of the synchronous single-liquid slurry being added into a synchronous grouting system, and the synchronous grouting steps for the gap between the separated pipe pieces and the soil strata while the shield tunnel is being excavated.

Further, in one specific execution mode, the synchronous grouting system comprises 8 synchronous grouting units, each of the synchronous grouting unit comprises a grouting pipeline, the grouting pipeline comprises a slurry inlet and a scouring fluid inlet, being connected to a slurry pumping pipe and a scouring fluid delivery pipe respectively. The slurry pumping pipe is connected to a slurry storage tank, the scouring fluid delivery pipe is connected to a scouring fluid storage tank; a scouring fluid inlet valve is set on the grouting pipeline.

Further, the slurry inlet and the scouring fluid inlet are located on both sides of the grouting pipeline.

Further, the slurry pumping pipeline and scouring fluid pumping pipeline are provided with transfer pumps.

Further, the synchronous grouting pipelines of grouting units are positioned in the circular interspace between shield segment and weak soil strata.

Further, each of the synchronous grouting unit is evenly distributed, and the synchronous grouting pipelines of grouting units are positioned between shield segment and weak soil strata around a circle. The flushing liquid inlet valve is closed when grouting, and the synchronous single-liquid grouting slurry is added to the slurry storage tank of each of the synchronous grouting unit, and the slurry flows out from eight grouting pipelines at the same time. After grouting, the flushing liquid inlet valve is opened and the flushing liquid is pumped into the slurry pumping pipe and grouting pipeline. The grouting pressure is 0.4-0.7 MPa, the grouting volume is controlled at 60-130 L/min, and the volume ratio of upper grouting pipeline and lower grouting pipeline is 6:4-7:3. The upper and lower grouting pipelines refer to the upper and lower semicircle parts of the grouting pipelines, respectively. The volume ratio of upper grouting pipeline and lower grouting pipeline is 6:4-7:3.

The beneficial effects of the present invention are as follows.

1. The present invention uses fly ash, steel slag, slag and other industrial solid wastes, which have different chemical compositions, but their main chemical components are $SiO_2$, $CaO$, $Fe_2O_3$, etc., they all have potential cementitious reactivities and they can replace a certain amount of cement. Some performance of slurries prepared with such solid waste materials can be better than pure cement slurries 2. The invention uses gold tailing, waste clay brick and limestone tailing as raw materials. Gold tailing of 120-600 μm are innovatively used as slurry fine aggregate with 40-60% of the total slurry volume; gold tailing with maximum particle size $d_{max}$ less than 120 μm can significantly enhance their cementitious reactivities and generate hydration products more effectively after grinding. The particle size grading or classification of gold tailing is in a more creatively targeted manner, which can increase the fluidity and filling efficiency of the synchronous single-liquid grouting slurry, reduce the water bleeding rate of the slurry. The fine gold tailing in the slurry come into being the skeleton, which is conducive to increasing filling rate and improving reinforcement strength. The addition of waste clay brick and limestone tailing can reduce the exothermic heat of cement hydration, promote the hydration process, and it can play an active role in later stages of hydration to generate more new hydration products and reduce the pore volume.

3. This invention adopts limestone tailing, steel slag, waste clay brick and other solid waste materials for ball milling, and the particle size gradation of each cementitious material and the mixing type of raw materials have been optimized. It not only increases the specific surface area of solid waste, improves the volcanic ash activity of the material, but also achieves the purpose of superposition effect of each component, the overall particle size uniformity of mixed material is good, the speed of hydration reaction is more effective, and the cementing properties of the slurry are further enhanced significantly.

4. In the quick-setting and early-strength composite additive of the present invention, the side effect of triethanolamine is little, and it does not change the hydration products of cement, meanwhile, the activity of the colloid hydration products is strengthened and the early strength effect is obvious, and there is also a certain enhancement effect in later stages. Sodium aluminate can greatly accelerate the setting time of the slurry, and it is beneficial for shield synchronous grouting in the muddy water or dynamic water environments.

5. In general, the water bleeding rate of hardenable single-liquid slurry is less than 5%, its stone rate is less than 85%, its initial setting time is more than 10 h, its filling rate is less than 90%, and the 28 d strength of stone body is 0.5-1.5 MPa. The slurry of the present invention meets the requirements of general single-liquid slurry, and the performance is better than ordinary single-liquid slurry. This invention optimizes the formulation of slurry, the early strength of slurry stone body is high, the 3 d strength can achieve 5-8 MPa, the 28 d strength can achieve 30 MPa, it has good fluidity, good filling rate (>95%), controllable setting time within 1-2 h, strong resistance to water solubility, strong erosion resistance, strong durability and long-term stability performance. It can effectively fill the annular gap between the pipe sheet and the soil under the high pressure (more than 0.5 MPa) environments, and control the ground disturbance and prevent pipe sheet uplift. At the same time, the slurry has high resistance to water wash out under shield mud water or dynamic water conditions, its stone rate is more than 90%, which solves the problems of low filling strength, poor filling performance, easy bleeding and delamination, and uncontrollable setting time caused by the easy washing out of single-liquid slurry.

6. This invention optimizes and integrates the slurry preparation processes of crushing—sieving—premixing—ultra-fine ball milling—homogenization, particle size classification, and variable or shifting speed mixing. The eight-point grouting technique at the end of the shield tail is developed for large diameter shield engineering under water-rich, high-pressure and weak soil strata conditions, it injects the single-liquid slurry with a volume ratio of 6:4-7:3 between the upper and lower parts into the shield tunnel gap. The above single-liquid slurry preparation process and shield grouting technique are based on engineering application challenges, this can ensure the slurry of this invention can fill the interspace between shield segment and weak soil strata with high water pressure more effectively, strengthen for a longer time, and more helpful in long-term prevention and control of segment uplift and strata deformation.

7. The whole slurry preparation process of this invention does not produce solid waste, while this invention applies industrial solid wastes such as gold tailing with full particle classifications, waste clay brick, steel slag, slags and limestone tailing as raw materials on a large scale, these industrial solid wastes are easy to find, their costs are lower, their production cycles are short, and they are non-toxic. Therefore, it has advantages of environmental protection and efficient resource recycling.

BRIEF DESCRIPTION OF THE DRAWINGS

In Figures, 1 represents slurry storage tank, 2 represents scouring fluid storage tank, 3 represents slurry pumping pipeline, 4 represents scouring fluid delivery pipe, 5 represents slurry pumping line, 6 represents transfer pump, 7 represents scouring fluid valve, 8 represents instrument for flow amount and rate, 9 represents extend-retract driving device, 10 represents shield segment, 11 represents soil, 12 represents slurry, 13 represents shield shell.

DETAILED DESCRIPTION OF THE EMBODIMENTS

In order to make the purpose, technical solutions and advantages of the embodiments in this present invention are clear, the embodiments of the present invention are described in further detail in combination with the embodiments and Figures. It should be noted that the following detailed descriptions are exemplary, aimed at providing further illustration in the present invention. Unless otherwise indicated, all technical and scientific terms used herein have the same meaning as commonly understood by ordinary technical person in the related technical field.

In the following embodiments, the gold tailing being sieved to obtain gold tailing I with maximum particle size $d_{max}$ less than 120 μm and gold tailing II with particle size ranging of 120-600 μm. The gold tailing I and II are applied as cementitious grouting material and slurry fine aggregate respectively. The silicate cement clinker is low alkali silicate cement clinker and it conforms to GB/T 21372-2008; the fly ash is Grade I fly ash, its sieving residual is less than 14.7% with the 45 μm square sieve, and its required water ratio is 96%; the waste clay brick powder conforms to YB/T 4168-2019 and it is obtained by ball milling; the slag powder is granulated blast furnace slag powder and it accords with GB/T 18046-2008; the limestone tailing powder accords with GB/T 30190-2013, its calcium carbonate mass fraction is not less than 80%, and its alumina mass fraction is not more than 2.0%; the steel slag powder accords with YB/T 022-2008; the $SiO_2$ content in the silica fume is more than 97%; the desulfurization gypsum is flue gas desulfurization gypsum and it conforms to JC/T 2074-2011; the calcium formate is industrial calcium formate and it conforms to HG/T 5614-2019; the triethanolamine is industrial liquid triethanolamine and it conforms to HG/T 3268-2002; the sodium aluminate is industrial sodium aluminate and it conforms to HG/T 4518-2013; the calcium nitrite is industrial calcium nitrite and it conforms to GB/T 28656-2012.

Implementation Example 1

A synchronous single-liquid grouting slurry for large diameter shield engineering under water-rich, high-pressure and weak soil strata conditions, comprising the following weights of raw materials: 1100 parts of gold tailing, 450 parts of silicate cement clinker, 230 parts of fly ash, 75 parts of waste clay brick, 75 parts of slag, 30 parts of limestone tailing, 70 parts of steel slag, 30 parts of silica fume, 15 parts of desulfurized gypsum, and 10 parts of quick-setting and early-strength composite additive. The quick-setting and early-strength composite additive comprises the following weight percents of raw materials: 35% of calcium formate, 35% of triethanolamine, 15% of sodium aluminate, 15% of calcium nitrite.

The preparation process for the synchronous single-liquid grouting slurry, comprising:

Step (1): the silicate cement clinker, the steel slag, the waste clay brick, the slag and the limestone tailing being crushed separately, then being ball-milled until a maximum particle size being less than 120 μm, and then the required materials being weight and mixed for later use;

Step (2): the gold tailing being sieved to obtain gold tailing I with maximum particle size $d_{max}$ less than 120 μm and gold tailing II with particle size ranging of 120-600 μm, the gold tailing being weighed according to the proportion of gold tailing II is 45% of a total volume of the slurry for later use;

Step (3): the fly ash, the silica fume and the desulfurization gypsum being sieved so that their maximum particle sizes being less than 120 μm, and then being weighed and mixed well for later use;

Step (4): a mixture in step (1), the gold tailing I with the maximum particle size $d_{max}$ less than 120 μm in step (2) and a mixture in step (3) being mixed uniformly, and then being ball-milled until the $d_{50}$, $d_{85}$ and $d_{95}$ of the material particles are 35-40, 42-48 and 50-55 μm, respectively, and a mixing group I being obtained;

Step (5): the calcium formate, the triethanolamine, the calcium nitrite and the sodium aluminate being weighed according to a proportion, being mixed and dissolved in water at 200-300 r/min for at least one minute, and a mixing group II being obtained;

Step (6): the mixing group I and the mixing group II being mixed in a ratio of water-binder ratio (w/b) of 0.9:1, and then the mixtures being mixed at a stirring speed of 1200 r/min for 5 minutes;

Step (7): gold tailing II with the particle size range of 120-600 μm being added to the mixture in step (6), being stirred at the speed of 600 r/min for 4 minutes, then a stirring speed being adjusted to be 1200 r/min for 2 minutes to obtain a synchronous single-liquid grouting slurry for large diameter shield engineering under water-rich, high-pressure and weak soil strata conditions.

Implementation Example 2

A synchronous single-liquid grouting slurry for large diameter shield engineering under water-rich, high-pressure and weak soil strata conditions, comprising the following weights of raw materials: 1050 parts of gold tailing, 420 parts of silicate cement clinker, 220 parts of fly ash, 45 parts of waste clay brick, 65 parts of slag, 25 parts of limestone tailing, 70 parts of steel slag, 30 parts of silica fume, 15 parts of desulfurized gypsum, 9 parts of quick-setting and early-strength composite additive. The quick-setting and early-strength composite additive is in accordance with Implementation Example 1.

The preparation process for the synchronous single-liquid grouting slurry is in the same way as Implementation Example 1.

Implementation Example 3

A synchronous single-liquid grouting slurry for large diameter shield engineering under water-rich, high-pressure and weak soil strata conditions, comprising the following weights of raw materials: 1200 parts of gold tailing, 480 parts of silicate cement clinker, 240 parts of fly ash, 120 parts of waste clay brick, 95 parts of slag, 45 parts of limestone tailing, 80 parts of steel slag, 45 parts of silica fume, 22 parts of desulfurized gypsum, 15 parts of quick-setting and early-strength composite additive. The quick-setting and early-strength composite additive is in accordance with Implementation Example 1.

The preparation process for the synchronous single-liquid grouting slurry is in the same way as Implementation Example 1.

Implementation Example 4

A synchronous single-liquid grouting slurry for large diameter shield engineering under water-rich, high-pressure and weak soil strata conditions, the composition of raw materials is the same as Implementation Example 1.

The preparation process for the synchronous single-liquid grouting slurry, comprising:

Steps (1)-(5): they are the same as the step (1)-(5) of Implementation Example 1.

Steps (6): the mixing group I and the mixing group II being mixed in a ratio of water-binder ratio (w/b) of 1.3:1, and then the mixtures being mixed at a stirring speed of 1000 r/min for 5 minutes;

Steps (7): gold tailing II with the particle size range of 120-600 μm being added to the mixture in step (6), being stirred at the speed of 500 r/min for 4 minutes, then a stirring speed being adjusted to be 1000 r/min for 1 minute to obtain a synchronous single-liquid grouting slurry for large diameter shield engineering under water-rich, high-pressure and weak soil strata conditions.

Implementation Example 5

A synchronous single-liquid grouting slurry for large diameter shield engineering under water-rich, high-pressure and weak soil strata conditions, the composition of raw materials is the same as Implementation Example 1. The described quick-setting and early-strength composite additive comprises the following weight percents of raw materials: 35% of calcium formate, 33% of triethanolamine, 20% of sodium aluminate and 12% of calcium nitrite.

The preparation process for the synchronous single-liquid grouting slurry, comprising:

Step (1): it is the same as the step (1) of Implementation Example 1;

Step (2): the gold tailing being sieved to obtain gold tailing I with maximum particle size $d_{max}$ less than 120 μm and gold tailing II with particle size ranging of 120-600 μm, the gold tailing being weighed according to the proportion of gold tailing II is 55% of a total volume of the slurry for later use;

Step (3)-(7): they are the same as the step (3)-(7) of Implementation Example 1.

Contrast Example 1

A synchronous single-liquid grouting slurry for large diameter shield engineering under water-rich, high-pressure and weak soil strata conditions, comprising the following weights of raw materials: 1100 parts of ordinary river sand, 450 parts of silicate cement clinker, 230 parts of fly ash, 75 parts of waste clay brick, 75 parts of slag, 30 parts of limestone tailing, 70 parts of steel slag, 30 parts of silica fume, 15 parts of desulfurized gypsum, 10 parts of quick-setting and early-strength composite additive. The quick-setting and early-strength composite additive is in accordance with Implementation Example 1.

The preparation process for the synchronous single-liquid grouting slurry, comprising:

Step (1): the silicate cement clinker, the steel slag, the waste clay brick, the slag and the limestone tailing being crushed separately, then being ball-milled until a maximum particle size being less than 120 μm, and then the required materials being weighed and mixed for later use;

Step (2): the ordinary river sand being sieved to obtain sand I with maximum particle size $d_{max}$ less than 120 μm and sand II with particle size ranging of 120-600 μm, the ordinary river sand being weighed according to the proportion of sand II is 45% of a total volume of the slurry for later use;

Step (3): the fly ash, the silica fume and the desulfurization gypsum being sieved so that their maximum particle sizes being less than 120 μm, and then being weighed and mixed well for later use;

Step (4): Step (4): a mixture in step (1), the sand I with the maximum particle size $d_{max}$ less than 120 μm in step (2) and a mixture in step (3) being mixed uniformly, and then being ball-milled until the $d_{50}$, $d_{85}$ and $d_{95}$ of the material particles are 35-40, 42-48 and 50-55 μm, respectively, and a mixing group I being obtained;

Step (5): the calcium formate, the triethanolamine, the calcium nitrite and the sodium aluminate being weighed according to a proportion, being mixed and dissolved in water at 200-300 r/min for at least one minute, and a mixing group II being obtained;

Step (6): the mixing group I and the mixing group II being mixed in a ratio of water-binder ratio (w/b) of 0.9:1, and then the mixtures being mixed at a stirring speed of 1200 r/min for 5 minutes;

Step (7): sand II with the particle size range of 120-600 μm being added to the mixture in step (6), being stirred at the speed of 600 r/min for 4 minutes, then a stirring speed being adjusted to be 1200 r/min for 2 minutes to obtain a synchronous single-liquid grouting slurry for large diameter shield engineering under water-rich, high-pressure and weak soil strata conditions.

Contrast Example 2

A synchronous single-liquid grouting slurry for large diameter shield engineering under water-rich, high-pressure and weak soil strata conditions, comprising the following weights of raw materials: 1100 parts of ordinary river sand, 450 parts of silicate cement clinker, 230 parts of fly ash, 75 parts of waste clay brick, 75 parts of slag, 30 parts of limestone tailing, 70 parts of steel slag, 30 parts of silica fume and 15 parts of desulfurized gypsum.

The preparation process for the synchronous single-liquid grouting slurry, comprising:

Step (1): the silicate cement clinker, the steel slag, the waste clay brick, the slag and the limestone tailing being crushed separately, then being ball-milled until a maximum particle size being less than 120 μm, and then the required materials being weighed and mixed for later use;

Step (2): the ordinary river sand being sieved to obtain sand I with maximum particle size $d_{max}$ less than 120 μm and sand II with particle size ranging of 120-600 μm, the ordinary river sand being weighed according to the proportion of sand II is 45% of a total volume of the slurry for later use;

Step (3): the fly ash, the silica fume and the desulfurization gypsum being sieved so that their maximum particle sizes being less than 120 μm, and then being weighed and mixed well for later use;

Step (4): a mixture in step (1), the sand I with the maximum particle size $d_{max}$ less than 120 μm in step (2) and a mixture in step (3) being mixed uniformly, and then being ball-milled until the $d_{50}$, $d_{85}$ and $d_{95}$ of the material particles are 35-40, 42-48 and 50-55 μm, respectively, and a mixing group I being obtained;

Step (5): the mixing group I being mixed in a ratio of water-binder ratio (w/b) of 0.9:1, and then the mixtures being mixed at a stirring speed of 1200 r/min for 5 minutes;

Step (6): sand II with the particle size range of 120-600 μm being added to the mixture in step (5), being stirred at the speed of 600 r/min for 4 minutes, then a stirring speed being adjusted to be 1200 r/min for 2 minutes to obtain a synchronous single-liquid grouting slurry for large diameter shield engineering under water-rich, high-pressure and weak soil strata conditions.

Contrast Example 3

A synchronous single-liquid grouting slurry for large diameter shield engineering under water-rich, high-pressure and weak soil strata conditions, comprising the following weights of raw materials: 1100 parts of gold tailing, 450 parts of silicate cement clinker, 230 parts of fly ash, 75 parts of slag, 70 parts of steel slag, 30 parts of silica fume, 15 parts of desulfurized gypsum, and 10 parts of quick-setting and early-strength composite additive. The quick-setting and early-strength composite additive is the same as Implementation Example 1.

The preparation process for the synchronous single-liquid grouting slurry, comprising:

Step (1): the silicate cement clinker, the steel slag, and the slag being crushed separately, then being ball-milled until a maximum particle size being less than 120 μm, and then the required materials being weighed and mixed for later use;

Step (2): the gold tailing being sieved to obtain gold tailing I with maximum particle size $d_{max}$ less than 120 μm and gold tailing II with particle size ranging of 120-600 μm, the gold tailing being weighed according to the proportion of gold tailing II is 45% of a total volume of the slurry for later use;

Step (3): the fly ash, the silica fume and the desulfurization gypsum being sieved so that their maximum particle sizes being less than 120 μm, and then being weighed and mixed well for later use;

Step (4): a mixture in step (1), the gold tailing I with the maximum particle size $d_{max}$ less than 120 μm in step (2) and a mixture in step (3) being mixed uniformly, and then being ball-milled until the $d_{50}$, $d_{85}$ and $d_{95}$ of the material particles are 35-40, 42-48 and 50-55 μm, respectively, and a mixing group I being obtained;

Step (5): the calcium formate, the triethanolamine, the calcium nitrite and the sodium aluminate being weighed according to a proportion, being mixed and dissolved in water at 200-300 r/min for at least one minute, and a mixing group II being obtained;

Step (6): the mixing group I and the mixing group II being mixed in a ratio of water-binder ratio (w/b) of 0.9:1, and then the mixtures being mixed at a stirring speed of 1200 r/min for 5 minutes;

Step (7): gold tailing II with the particle size range of 120-600 μm being added to the mixture in step (6), being stirred at the speed of 600 r/min for 4 minutes, then a stirring speed being adjusted to be 1200 r/min for 2 minutes to obtain a synchronous single-liquid grouting slurry for large diameter shield engineering under water-rich, high-pressure and weak soil strata conditions.

Contrast Example 4

A synchronous single-liquid grouting slurry for large diameter shield engineering under water-rich, high-pressure and weak soil strata conditions, comprising the following weights of raw materials: 1100 parts of gold tailing, 300 parts of silicate cement clinker, 350 parts of fly ash, 75 parts of waste clay brick, 75 parts of slag, 30 parts of limestone tailing, 70 parts of steel slag, 30 parts of silica fume, 30 parts of desulfurized gypsum, 10 parts of quick-setting and early-strength composite additive. The quick-setting and early-strength composite additive is the same as Implementation Example 1.

The preparation process for the synchronous single-liquid grouting slurry is in the same way as Implementation Example 4, the bleeding rate of slurry is high, and the bleeding rate is more than 5% within 30 minutes.

Contrast Example 5

A synchronous single-liquid grouting slurry for large diameter shield engineering under water-rich, high-pressure and weak soil strata conditions. The composition of raw material is the same as Implementation Example 1.

The preparation process for the synchronous single-liquid grouting slurry, comprising:

Step (1): the silicate cement clinker, the steel slag, the waste clay brick, the slag and the limestone tailing being crushed separately, then being ball-milled until a maximum particle size being less than 120 μm, and then the required materials being weighed and mixed for later use;

Step (2): the gold tailing being weighed according to the proportion for later use;

Step (3): the fly ash, the silica fume and the desulfurization gypsum being sieved so that their maximum particle sizes being less than 120 μm, and then being weighed and mixed well for later use;

Step (4): a mixture in step (1) and a mixture in step (3) being mixed uniformly, and a mixing group I being obtained.

Step (5): the calcium formate, the triethanolamine, the calcium nitrate and the sodium aluminate being weighed according to a proportion, being mixed and dissolved in water at 200-300 r/min for at least one minute, and a mixing group II being obtained;

Step (6): the gold tailing, the mixing group I and the mixing group II being mixed in a ratio of water-binder ratio (w/b) of 0.9:1, and then the mixtures being mixed at a stirring speed of 1000 r/min for 8-10 minutes to obtain a synchronous single-liquid grouting slurry for large diameter shield engineering under water-rich, high-pressure and weak soil strata conditions.

Validation Example

In order to verify the performance of the synchronous single-liquid grouting slurry obtained from the above Implementation and Contrast Examples, the following experiments are conducted.

The synchronous single-liquid grouting slurries in Implementation and Contrast Examples are poured into triple connected mold to cast the specimens, the mold size is 40×40×160 mm, and the specimens are cured under standard curing conditions (temperature 20±2° C., relative humidity>95%) at least for 24 h, then they are demolded, and they continue to be cured under standard curing conditions until the test age. The compressive strength is tested according to GB/T 17671-1999 "Test method for cementitious sand strength (ISO method)".

For the synchronous single-liquid grouting slurry prepared by the Implementation Example and the Contrast Example, the setting time is tested according to GB/T 1346-2011 "Standard consistency of cement water consumption, setting time and stability test method". Referring to GB/T 25182-2010 "Pre-stressing hole grouting agent", its water bleeding rate is tested, inject 90±2 mL of grouting slurry into 100 mL measuring cylinder, it is placed on horizontal surface, and it is sealed tightly with cling film, the height of dissociated water surface $a_2$ and the height of grouting slurry surface $a_1$ is recorded after 2 h. According to the formula B (water bleeding rate)=$[(a_2-a_1)/a_2]\times100\%$, its 2 h water bleeding rate is calculated, and the stone rate is calculated according to the water bleeding rate, stone rate=1−water bleeding rate. The mini-slump is tested according to GB/T 50448-2015 "Technical Specification for Application of Cement-based Grouting Materials".

For the synchronous single-liquid grouting slurry prepared through the Implementation Example and the Contrast Example, a model test device is adopted for testing the filling rate. The model test device contains shield shell, slurry injection pipeline, segment, muddy water stratum, and pressure device, they are combined to simulate muddy water shield conditions. The volume between one ring of segment and shield shell is designed to be $V_2$, and the protrusive shield is adopted. During the design time when the shield shell advances the width of one segment ring, the above synchronous single-liquid grouting slurry is injected into the gap between the segment and weak soil stratum. After 24 hours, the stone body is removed and the volume of stone body $V_1$ is calculated. The filling rate is calculated based on the formula: $D=V_1/V_2$. The filling rate represents the filling performance of the synchronous grouting slurry under muddy water shield conditions.

The experimental results are shown in Table 1.

TABLE 1

| | Initial Setting Time (min) | Filling Rate (%) | Fluidity (mm) | Bleeding rate (%) | Stone rate (%) | 3 d compressive strength (MPa) | 28 d compressive strength (MPa) |
|---|---|---|---|---|---|---|---|
| Implementation Example 1 | 60 | 98% | 270 | 2.6 | 97.4% | 8.4 | 30.3 |
| Implementation Example 2 | 69 | 97% | 267 | 3.5 | 96.5% | 6.2 | 23.2 |

TABLE 1-continued

|  | Initial Setting Time (min) | Filling Rate (%) | Fluidity (mm) | Bleeding rate (%) | Stone rate (%) | 3 d compressive strength (MPa) | 28 d compressive strength (MPa) |
|---|---|---|---|---|---|---|---|
| Implementation Example 3 | 62 | 97% | 262 | 3.2 | 96.8% | 7.5 | 26.5 |
| Implementation Example 4 | 77 | 95% | 281 | 7.5 | 92.5% | 5.0 | 18.8 |
| Implementation Example 5 | 67 | 96% | 260 | 5.1 | 94.9% | 7.8 | 27.6 |
| Contrast Example 1 | 68 | 97% | 260 | 3.0 | 97.0% | 6.5 | 28.4 |
| Contrast Example 2 | 113 | 90% | 255 | 3.9 | 96.1% | 3.2 | 14.1 |
| Contrast Example 3 | 75 | 94% | 275 | 4.2 | 95.8% | 6.5 | 20.7 |
| Contrast Example 4 | 85 | 93% | 285 | 10.5 | 89.5% | 5.2 | 19.5 |
| Contrast Example 5 | 80 | 95% | 264 | 6.2 | 93.8% | 7.3 | 20.4 |

From the results of in table 1, the slurry obtained from each embodiment of this present invention can effectively meet the general performance requirements for single-liquid grouting for shield structures in water-rich strata, the setting time of the slurry is shorter, the early and late strengths are higher.

APPLICATION EXAMPLES

From the above experiments, the synchronous single-liquid grouting slurry for large diameter shield engineering under water-rich, high-pressure and weak soil strata condition has excellent performance, and it can be applied in water-rich silt layers, water-rich medium-coarse sand layers, water-rich medium-fine sand layers, water-rich clay layers or water-rich fluid plastic soil layers in shield tunnel and underground engineering. The synchronous grouting is carried out behind the shield wall by synchronous grouting system.

Preferably, the invention uses a synchronous grouting system containing eight grouting lines to carry out synchronous grouting at eight points at the end of the shield. The slurry is injected into the gaps behind the segment piece, it flows to all parts of the void under pressure and self-weight condition, and it solidifies for a certain time. The purpose of filling gap and preventing the soil from collapsing can be achieved.

Figure 1:
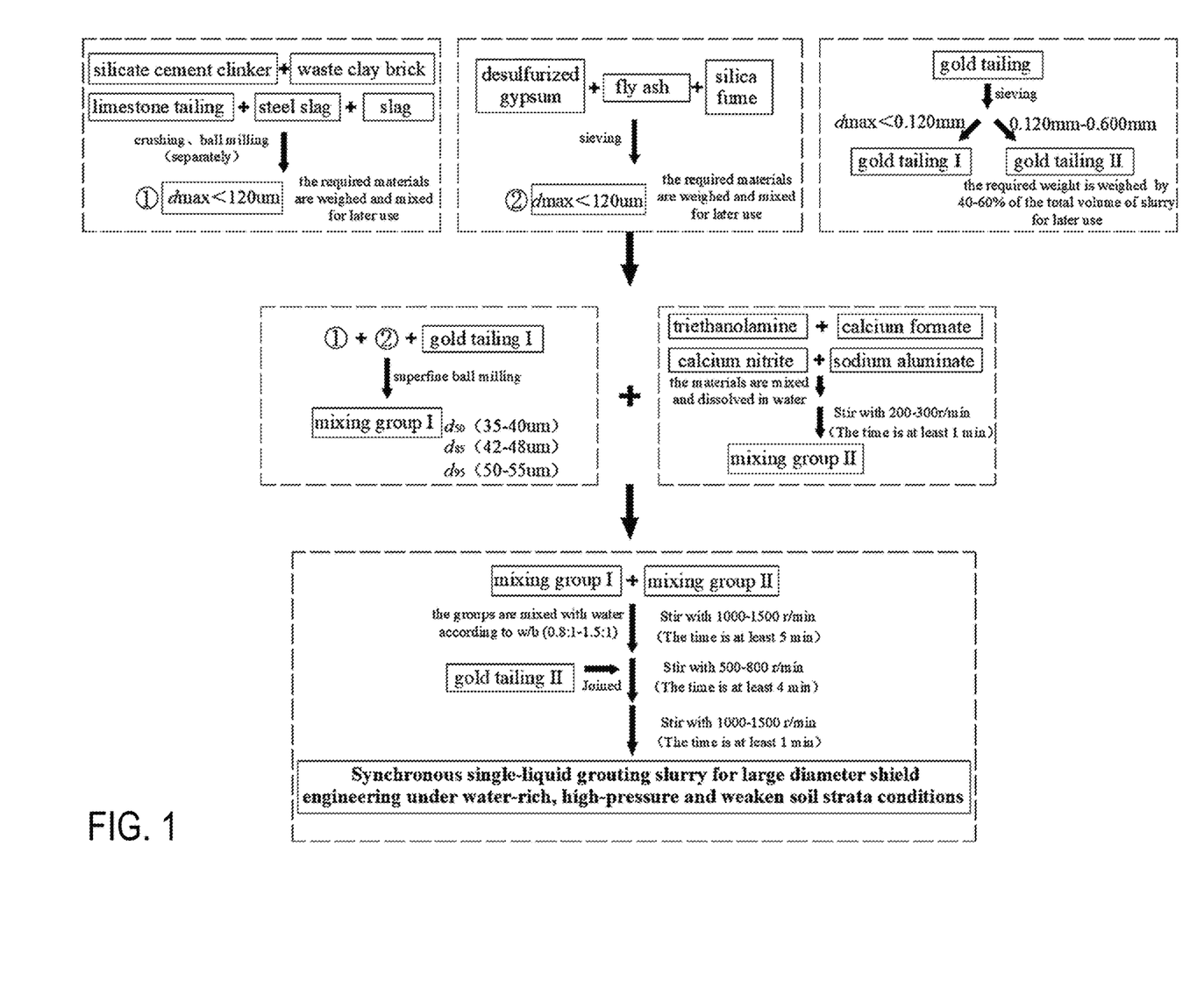
FIG. 1 shows the preparation process flow diagram of synchronous single-liquid grouting slurry for large diameter shield engineering under water-rich, high-pressure and weak soil strata conditions in this present invention.
Figure 2:
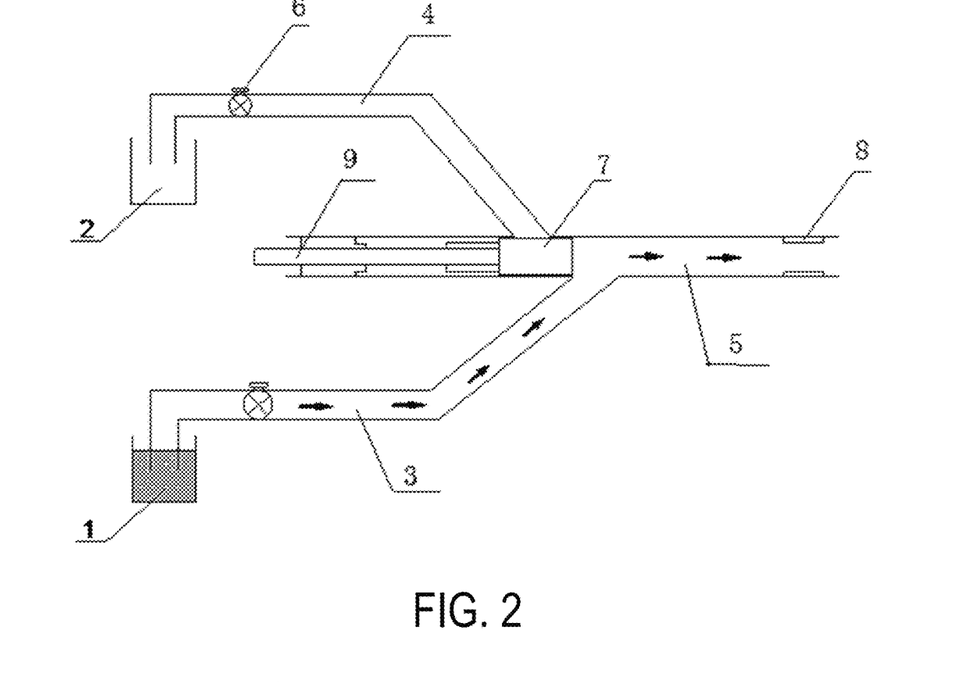
FIG. 2 shows the structure schematic diagram of synchronous grouting unit of the synchronous grouting system during grouting in this present invention.
Figure 3:
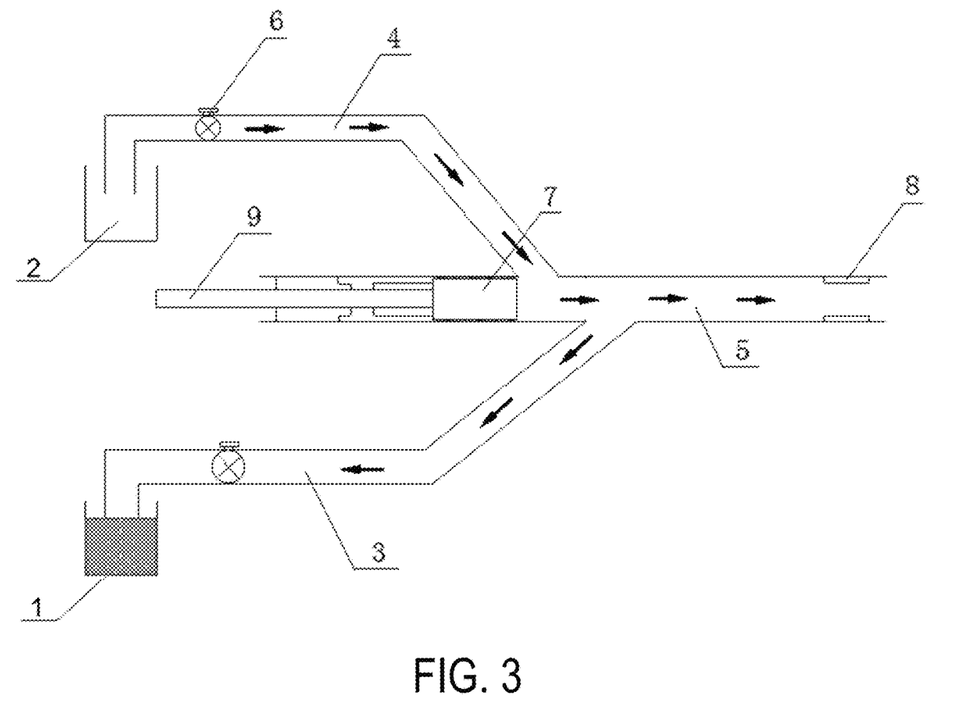
FIG. 3 shows the structure schematic diagram of synchronous grouting unit of the synchronous grouting system when flushing is performed and after grouting in this present invention.

Further, the synchronous grouting system includes 8 synchronous grouting units, each synchronous grouting unit structure is shown in FIGS. 2 and 3. It includes a grouting pipeline, the grouting line is a straight pipe, the grouting line is connected to the gap between the soil and the shield segment, it is used for filling the gap between the soil and the shield segment. One end of the grouting line is closed and one end is a liquid outlet, and the grouting line is provided with a slurry inlet and a scouring liquid inlet, the slurry inlet and the scouring liquid inlet are located on both sides of the grouting line, and the slurry inlet is closer to the liquid outlet of the grouting line in comparison with the scouring liquid inlet. The slurry inlet and scouring liquid inlet are connected to the slurry pumping pipe and scouring liquid transport pipe respectively, and the slurry transport pipe is connected to the slurry storage tank, and the scouring liquid transport pipe is connected to the scouring liquid storage tank.

Further, the slurry pumping pipeline and scouring liquid transfer pipeline are provided with transfer pump. The slurry line is provided with a scouring fluid inlet valve for controlling the scouring fluid inlet to close or open. During grouting, as shown in FIG. 2, the flushing liquid inlet valve is closed, and the slurry enters the grouting pipeline through the slurry inlet. The slurry is injected to fill the shield gaps between shield segment and the soil strata. When the grouting is completed, as shown in FIG. 3, the flushing liquid inlet valve is opened, and the flushing liquid enters the grouting pipeline and the slurry delivery pipe through the flushing liquid inlet. The pipeline is cleaned to prevent the slurry condensing and blocking the pipeline.

Further, the flushing fluid inlet valve is s matched with the grouting line so that the grouting line can be sealed. The scouring fluid inlet valve can be connected to the device 9, which is connected to the scouring fluid valve 7. Through the forward or backward movement of the device 9, close or open the scouring fluid inlet, so that the scouring fluid can enter the grouting line to wash it.

Further, there is a flow rate meter at the outlet of the grouting line, so that the flow amount and flow rate of the synchronous grouting slurry can be monitored and fed back to the console. The flow rate and flow rate are monitored and fed back timely.

Figure 4:
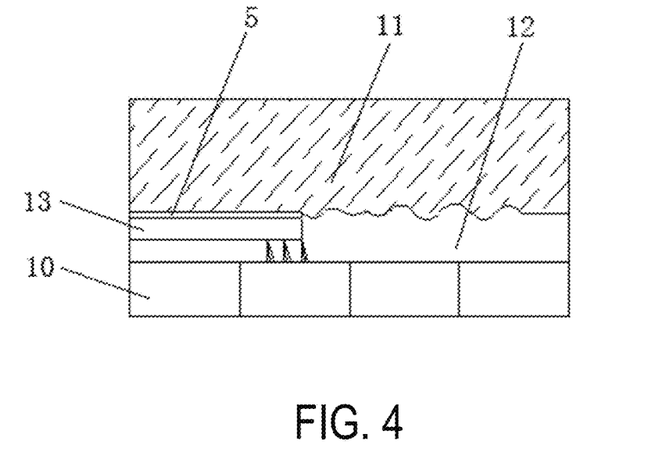
FIG. 4 shows schematic diagram of synchronous grouting in this present invention.
Figure 5:
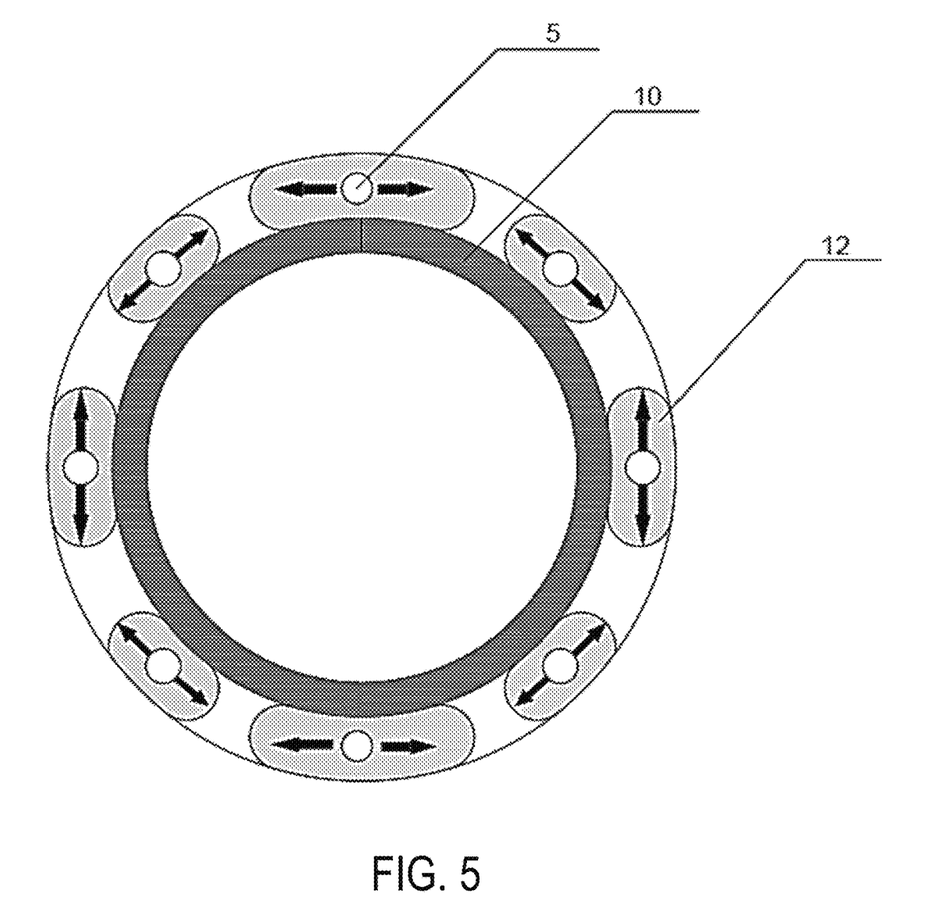
FIG. 5 shows a cross-section schematic diagram of the synchronous grouting system in this present invention.
Figure 6:
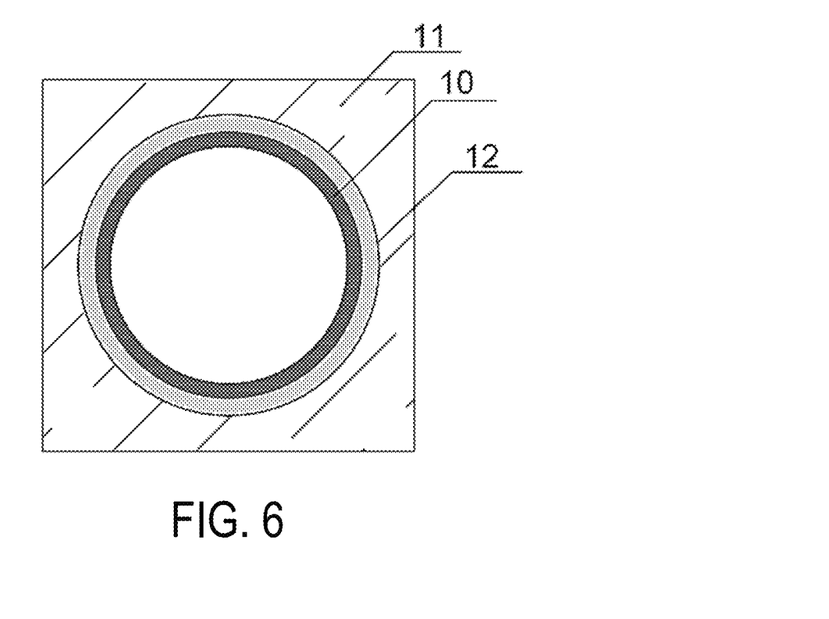
FIG. 6 shows a grouting effect schematic diagram of synchronous grouting in this present invention.

Further, when the above synchronous grouting system is used to grouting slurry of the present invention synchronously, the shield tail grouting is used, and the grouting schematic is shown in FIG. 4. As shown in FIG. 5, each synchronous grouting unit is distributed evenly, and the grouting lines of each synchronous grouting unit are positioned in the gap between the soil and the shield segment. When grouting, the flushing liquid inlet valve is closed, and the synchronous single-liquid grouting slurry is added to the slurry storage tank of each synchronous grouting unit, the slurry flows from eight grouting pipelines at the same time. The grouting pressure is 0.4-0.7 MPa, the grouting volume is controlled at 60-130 L/min, and the volume ratio of the upper and lower grouting pipelines is 6:4-7:3. The injection rate is 125-150%; when the injection pressure reaches 0.7 MPa, the flow rate is controlled at 75-95 L/min. As shown in FIG. 6, the synchronous single-liquid injection slurry of the present invention fills the gap between the soil and the shield segment through the injection hole of the grouting pipe, the slurry diffuses in the gap well, and it fills the gap between the shield segment and the soil body is well filled.

The above is only a preferred embodiment of this present application, and it is not intended to limit this present application. For the technical staff in this field, this invention can be changed variously. Any modification, equivalent replacement, improvement, etc. within the spirit and principles of this invention shall be within the protection scopes of this invention.

What is claimed is:

1. A synchronous single-liquid grouting slurry for large diameter shield engineering under water-rich, high-pressure and weak soil strata conditions, comprising the following weights of raw materials: 1050-1200 parts of gold tailing, 420-480 parts of silicate cement clinker, 220-240 parts of fly ash, 45-120 parts of waste clay brick, 65-95 parts of slag, 25-45 parts of limestone tailing, 70-80 parts of steel slag, 30-45 parts of silica fume, 15-22 parts of desulfurized gypsum, and 9-15 parts of quick-setting and early-strength composite additive, wherein the quick-setting and early-strength composite additive comprises the following weight percents of raw materials: 30-35% of calcium formate, 30-35% of triethanolamine, 15-20% of sodium aluminate, 10-15% of calcium nitrite; wherein the gold tailing comprises a gold tailing I with a maximum particle size $d_{max}$ of particles less than 120 μm, and a gold tailing II with a particle size between 120-600 μm, and a volume fraction of the gold tailing II is about 40-60% in the total volume of the slurry.

2. The synchronous single-liquid grouting slurry according to claim 1, wherein after crushing, sieving, premixing, superfine ball milling, second homogenization treatment, particle sizes of $d_{50}$, $d_{85}$ and $d_{95}$ of the silicate cement clinker, the fly ash, the waste clay brick, the slag, the limestone tailing, the steel slag, the silica fume, the desulfurization gypsum are 35-40 μm, 42-48 μm and 50-55 μm, respectively.

3. A preparation process for the synchronous single-liquid grouting slurry for large diameter shield engineering under water-rich, high-pressure and weak soil strata conditions according to claim 1, comprising:

(1) the silicate cement clinker, the steel slag, the waste clay brick, the slag and the limestone tailing being crushed separately, then being ball-milled until a maximum particle size being less than 120 μm, and then the required materials being weighed and mixed for later use;

(2) the gold tailing being sieved to obtain gold tailing I with maximum particle size $d_{max}$ less than 120 μm and gold tailing II with a particle size ranging of 120-600 μm, the gold tailing being weighed according to that a proportion of gold tailing II is 40-60% of a total volume of the slurry for later use;

(3) the fly ash, the silica fume and the desulfurization gypsum being sieved so that their maximum particle sizes being less than 120 μm, and then being weighed and mixed for later use;

(4) a mixture in step (1), the gold tailing I with the maximum particle size $d_{max}$ less than 120 μm in step (2) and a mixture in step (3) being mixed uniformly, and then being ball-milled until the $d_{50}$, $d_{85}$ and $d_{95}$ of the material particles are 35-40, 42-48 and 50-55 μm, respectively, and a mixing group I being obtained;

(5) the calcium formate, the triethanolamine, the calcium nitrite and the sodium aluminate being weighed according to a proportion, being mixed and dissolved in water at 200-300 r/min for at least one minute, and a mixing group II being obtained;

(6) the mixing group I and the mixing group II being mixed in a ratio of water-binder ratio (w/b) of 0.8:1-1.5:1, and then the mixtures being mixed at a stirring speed of 1000-1500 r/min for at least 5 minutes;

(7) gold tailing II with the particle size range of 120-600 μm being added to the mixture in step (6), being stirred at the speed of 500-800 r/min for at least 4 minutes, then a stirring speed being adjusted to 1000-1500 r/min for at least 1 minute to obtain a synchronous single-liquid grouting slurry for large diameter shield engineering under water-rich, high-pressure and weak soil strata conditions.

4. The preparation process according to claim 3, wherein in step (6), the slurry is stirred at a stirring speed of 1000-1500 r/min for 5-10 minutes.

5. The preparation process according to claim 3, wherein in step (7), the slurry is stirred at a stirring speed of 500-800 r/min for 4-6 minutes and at a stirring speed of 1000-1500 r/min for 1-5 minutes.

6. An application of the synchronous single-liquid grouting slurry for large diameter shield engineering under water-rich, high-pressure and weak soil strata conditions according to claim 1, wherein the synchronous single-liquid grouting slurry is suitable for applying in the construction of large-diameter shield machines with diameters greater than 11 m in water-rich weak soil strata with water-bearing pressures greater than 0.5 MPa, wherein the water-rich and weak soil strata include water-rich silt layers, water-rich medium-coarse sand layers, water-rich medium-fine sand layers, water-rich clay layers or water-rich fluid plastic soil layers.

7. A shield synchronous single-liquid grouting process for the synchronous single-liquid grouting slurry for large diameter shield engineering under water-rich, high-pressure and weak soil strata conditions, comprising: a synchronous single-liquid grouting slurry according to claim 1 being added into a synchronous grouting system, and grouting synchronously to fill an interspace between a shield segment and a weak soil strata during a shield excavation, wherein the synchronous grouting system comprises 8 synchronous grouting units, each of the synchronous grouting unit comprises a grouting pipeline, the grouting pipeline comprises a slurry inlet and a scouring fluid inlet, being connected to a slurry pumping pipe and a scouring fluid delivery pipe respectively, wherein the slurry pumping pipe is connected to a slurry storage tank, the scouring fluid delivery pipe is connected to a scouring fluid storage tank; a scouring fluid inlet valve is set on the grouting pipeline.

8. The shield synchronous grouting technique according to claim 7, wherein the slurry inlet and the scouring fluid inlet are located on both sides of the grouting pipeline.

9. The shield synchronous grouting technique according to claim 7, wherein the slurry pumping pipeline and the scouring fluid pumping pipeline are provided with transfer pumps.

10. The shield synchronous grouting technique according to claim 7, wherein each of the synchronous grouting unit is evenly distributed, and the synchronous grouting pipelines of grouting units are positioned between shield segment and weak soil strata around a circle, wherein the flushing liquid inlet valve is closed when grouting, and the synchronous single-liquid grouting slurry is added to the slurry storage tank of each of the synchronous grouting unit, and the slurry flows out from eight grouting pipelines at the same time, after grouting, the flushing liquid inlet valve is opened and the flushing liquid is pumped into the slurry pumping pipe and grouting pipeline; wherein a grouting pressure is 0.4-0.7

MPa, a grouting volume is controlled at 60-130 L/min, and a volume ratio of upper grouting pipeline and lower grouting pipeline is 6:4-7:3.

11. A preparation process for the synchronous single-liquid grouting slurry for large diameter shield engineering under water-rich, high-pressure and weak soil strata conditions according to claim 2, comprising:
(1) the silicate cement clinker, the steel slag, the waste clay brick, the slag and the limestone tailing being crushed separately, then being ball-milled until a maximum particle size being less than 120 μm, and then the required materials being weighed and mixed for later use;
(2) the gold tailing being sieved to obtain gold tailing I with maximum particle size $d_{max}$ less than 120 μm and gold tailing II with a particle size ranging of 120-600 μm, the gold tailing being weighed according to that a proportion of gold tailing II is 40-60% of a total volume of the slurry for later use;
(3) the fly ash, the silica fume and the desulfurization gypsum being sieved so that their maximum particle sizes being less than 120 μm, and then being weighed and mixed for later use;
(4) a mixture in step (1), the gold tailing I with the maximum particle size $d_{max}$ less than 120 μm in step (2) and a mixture in step (3) being mixed uniformly, and then being ball-milled until the $d_{50}$, $d_{85}$ and $d_{95}$ of the material particles are 35-40, 42-48 and 50-55 μm, respectively, and a mixing group I being obtained;
(5) the calcium formate, the triethanolamine, the calcium nitrite and the sodium aluminate being weighed according to a proportion, being mixed and dissolved in water at 200-300 r/min for at least one minute, and a mixing group II being obtained;
(6) the mixing group I and the mixing group II being mixed in a ratio of water-binder ratio (w/b) of 0.8:1-1.5:1, and then the mixtures being mixed at a stirring speed of 1000-1500 r/min for at least 5 minutes;
(7) gold tailing II with the particle size range of 120-600 μm being added to the mixture in step (6), being stirred at the speed of 500-800 r/min for at least 4 minutes, then a stirring speed being adjusted to 1000-1500 r/min for at least 1 minute to obtain a synchronous single-liquid grouting slurry for large diameter shield engineering under water-rich, high-pressure and weak soil strata conditions.

12. The preparation process according to claim 11, wherein in step (6), the slurry is stirred at a stirring speed of 1000-1500 r/min for 5-10 minutes.

13. The preparation process according to claim 11, wherein in step (7), the slurry is stirred at a stirring speed of 500-800 r/min for 4-6 minutes and at a stirring speed of 1000-1500 r/min for 1-5 minutes.

14. An application of the synchronous single-liquid grouting slurry for large diameter shield engineering under water-rich, high-pressure and weak soil strata conditions according to claim 2, wherein the synchronous single-liquid grouting slurry is suitable for applying in the construction of large-diameter shield machines with diameters greater than 11 m in water-rich weak soil strata with water-bearing pressures greater than 0.5 MPa, wherein the water-rich and weak soil strata include water-rich silt layers, water-rich medium-coarse sand layers, water-rich medium-fine sand layers, water-rich clay layers or water-rich fluid plastic soil layers.

15. A shield synchronous single-liquid grouting process for the synchronous single-liquid grouting slurry for large diameter shield engineering under water-rich, high-pressure and weak soil strata conditions, comprising: a synchronous single-liquid grouting slurry according to claim 2 being added into a synchronous grouting system, and grouting synchronously to fill an interspace between a shield segment and a weak soil strata during a shield excavation,
wherein the synchronous grouting system comprises 8 synchronous grouting units, each of the synchronous grouting unit comprises a grouting pipeline, the grouting pipeline comprises a slurry inlet and a scouring fluid inlet, being connected to a slurry pumping pipe and a scouring fluid delivery pipe respectively, wherein the slurry pumping pipe is connected to a slurry storage tank, the scouring fluid delivery pipe is connected to a scouring fluid storage tank; a scouring fluid inlet valve is set on the grouting pipeline.

16. The shield synchronous grouting technique according to claim 15, wherein the slurry inlet and the scouring fluid inlet are located on both sides of the grouting pipeline.

17. The shield synchronous grouting technique according to claim 15, wherein the slurry pumping pipeline and the scouring fluid pumping pipeline are provided with transfer pumps.

18. The shield synchronous grouting technique according to claim 15, wherein each of the synchronous grouting unit is evenly distributed, and the synchronous grouting pipelines of grouting units are positioned between shield segment and weak soil strata around a circle, wherein the flushing liquid inlet valve is closed when grouting, and the synchronous single-liquid grouting slurry is added to the slurry storage tank of each of the synchronous grouting unit, and the slurry flows out from eight grouting pipelines at the same time, after grouting, the flushing liquid inlet valve is opened and the flushing liquid is pumped into the slurry pumping pipe and grouting pipeline; wherein a grouting pressure is 0.4-0.7 MPa, a grouting volume is controlled at 60-130 L/min, and a volume ratio of upper grouting pipeline and lower grouting pipeline is 6:4-7:3.

* * * * *